United States Patent [19]
Cheng et al.

[11] Patent Number: 5,764,710
[45] Date of Patent: Jun. 9, 1998

[54] META-STABLE-RESISTANT FRONT-END TO A SYNCHRONIZER WITH ASYNCHRONOUS CLEAR AND ASYNCHRONOUS SECOND-STAGE CLOCK SELECTOR

[75] Inventors: Michael B. Cheng. San Jose; Anthony Yap Wong. Saratoga; Charles Hsiao. Fremont; Belle Wong. San Jose. all of Calif.

[73] Assignee: Pericom Semiconductor Corp., San Jose. Calif.

[21] Appl. No.: 573,407

[22] Filed: Dec. 15, 1995

[51] Int. Cl.⁶ .................................................. H04L 7/00
[52] U.S. Cl. ........................... 375/371; 327/154; 327/162
[58] Field of Search ........................... 375/354, 371; 371/1; 327/154, 161, 162; 370/503, 576

[56] References Cited

U.S. PATENT DOCUMENTS

| | | | |
|---|---|---|---|
| 4,965,814 | 10/1990 | Yoshida et al. | 375/371 |
| 5,155,745 | 10/1992 | Sugawara et al. | 375/371 |

*Primary Examiner*—Tesfaldet Bocure
*Assistant Examiner*—Bryan Webster
*Attorney, Agent, or Firm*—Stuart T. Auvinen

[57] ABSTRACT

A synchronizer that has reduced latency is used for synchronizing and conditioning a clock-enable signal to a free-running clock. Once the clock-enable signal is synchronized it is used to enable and disable gating of the free-running clock to a gated clock that suspends pulsing in response to the clock-enable signal. A first-stage flip-flop is 'meta-stable hardened' to reduce the probability of it becoming meta-stable. Gating on the clock and the clear inputs reduces the chance that simultaneous inputs will violate the timing of the flip-flop and thus cause metastability. A clear pulse is generated to clear the flip-flop. The clear pulse skews the flip-flop to be more likely to become metastable for one edge of the asynchronous input than for the other edge. The settling time to the second stage flip-flop is then adjusted to account for this skew in metastability. Settling time in the second stage is increased for the edge that is more likely to become metastable. Clock-enable conditioning to prevent partial output pulses is merged with the synchronizing function to further reduce latency.

18 Claims, 4 Drawing Sheets

META-STABLE-RESISTANT FRONT-END TO A SYNCHRONIZER WITH ASYNCHRONOUS CLEAR AND ASYNCHRONOUS SECOND-STAGE CLOCK SELECTOR

BACKGROUND OF THE INVENTION—FIELD OF THE INVENTION

This invention relates to electrical circuits, and more particularly for synchronizing and conditioning a clock enable signal to a clock for a clock-switching circuit.

BACKGROUND OF THE INVENTION— DESCRIPTION OF THE RELATED ART

Electronic circuits have employed synchronizers when the timing of an input signal is not fixed to the clock used by the electronic circuit. If such a synchronizer is not used, then the asynchronous input signal can produce meta-stable signals within the electronic circuit. These meta-stable signals are electrical nodes that are not at the defined logic levels but are instead at an intermediate voltage. Normally intermediate voltages are quickly driven to the high or the low logic level by active circuits. However, when the intermediate voltage is exactly at the logic threshold or switching point of a circuit, then the intermediate voltage can remain for a relatively long period of time. Thus the intermediate voltage can be stable for a relatively long period of time. The intermediate voltage is said to be meta-stable.

These intermediate voltages can be propagated through several levels of logic to the output. Because the meta-stable intermediate voltage decays to the logic levels as a function of time, temperature, and the difference in voltage from the exact logic threshold, the period of time until the meta-stable intermediate voltage decays or resolves can vary. Thus the output can switch at an improper time.

When the output of the electronic circuit is used to generate or gate off a clock, the output can only switch at predefined times. If the output is meta-stable, or if the output is driven by a meta-stable node which switches at an arbitrary time, then the clock generated can have pulses which are less than the full pulse-width. Clocks with partial pulses are often unacceptable as the partial pulse width can itself cause violations of internal setup or hold times in flip-flops controlled by the clock.

Thus a clock generating or gating circuit cannot accommodate meta-stable signals. The partial clock pulses resulting from metastable signals are unacceptable. A good synchronizer is necessary for these applications.

Many different synchronizers have been disclosed. See for example "Synchronizer for Asynchronous Computer Command Data", U.S. Pat. No. 5,155,745 to Sugawara et al.; "Aborting Synchronizer", U.S. Pat. No. 5,305,354 to Thaller et al.; "High Speed Data Synchronizer", U.S. Pat. No. 5,132,990 to Dukes; and "Two Stage Synchronizer", U.S. Pat. No. 4,821,295 to Sanner.

FIG. 1 is a simple prior-art synchronizer. Input signal 20 is asynchronous to clock 22. Flip-flop 10 receives the asynchronous input signal 20 on its D-input, which is latched in on the rising edge of clock 22. Flip-flop 10 can easily produce a meta-stable output. Since a meta-stable signal decays over time, the signal latched by flip-flop 10 is not immediately presented to output 24. Instead several clock periods of delay are introduced from the time the asynchronous input signal 20 is latched until output 24 is generated. Flip-flops 12, 14, 16 introduce a 3 clock-period delay which allows more time for a meta-stable voltage to decay or resolve.

While a synchronizer such as described for FIG. 1 is effective, many clock periods and stages of flip-flops may be required. These clock periods add a latency to the input signal 20 before it is acted upon. For a clock generating or gating circuit, this results in a delay of several clock periods until the clock is turned on or off. This delay often results in greater delay before a circuit using the generated or gated clock can respond. It is important to reduce this delay so that the clock may be enabled or disabled more rapidly.

What is desired is a synchronizer which requires fewer stages of flip-flops and thus has reduced latency. It is desired to use this reduced-latency synchronizer for synchronizing an asynchronous clock-enable signal to a free-running clock. It is further desired to condition this synchronized clock-enable signal for use as a gating signal for the free-running clock. The synchronized clock-enable signal is desired to be conditioned to prevent partial output pulses of the clock.

It is an object of the invention to reduce latency by 'meta-stable hardening' the first flip-flop stage to reduce the probability of it becoming meta-stable in the first place. It is another object of the invention to merge the clock-enable conditioning to prevent partial output pulses with the synchronizing function to further reduce latency. It is also an object of the invention to skew the first stage to be more likely to generate a metastable signal for one state change of the asynchronous input signal and then to compensate for this skew by adjusting the settling time to the second stage flip-flop.

SUMMARY OF THE INVENTION

A synchronizer with reduced latency is used for synchronizing and conditioning a clock-enable signal to a free-running clock. Once the clock-enable signal is synchronized it is used to enable and disable gating of the free-running clock to a gated clock that suspends pulsing in response to the clock-enable signal.

A synchronizer and clock gating circuit has a first input for receiving a free-running clock. The free-running clock pulses between a first state and a second state. A second input receives a clock-enable signal asynchronous to the free-running clock.

A synchronizing circuit receives the free-running clock and the clock-enable signal. It synchronizes the timing of the clock-enable signal to the free-running clock and outputs a synchronized gating signal. The synchronizing circuit includes a conditioning means for preventing the synchronized gating signal from changing state when a gated clock output is pulsed into the second state. A clock gating means receives the free-running clock and receives the synchronized gating signal. The clock gating means propagates the free-running clock to the gated clock output when the synchronized gating signal is in an enabled state, but it does not propagate the free-running clock to the gated clock output when the synchronized gating signal is not in the enabled state. The gated clock output remains in the first state and does not transition to the second state when the synchronized gating signal is not in the enabled state.

Thus the clock-enable signal is synchronized to the free-running clock and conditioned to prevent the synchronized gating signal from changing state when the gated clock output is pulsed into the second state.

In further aspects of the invention the synchronizing circuit has a first gating means that receives the clock-enable signal and the free-running clock. It propagates the free-running clock in response to the clock-enable signal. A first storage element receives the clock-enable signal and is coupled to the first gating means. The first storage means samples and stores the asynchronous clock-enable signal in response to the free-running clock propagated through the first gating means. The synchronizing circuit further has a second gating means which receives the clock-enable signal and the free-running clock. It propagates the free-running clock in response to the clock-enable signal. A one-shot means responds to the free-running clock propagated through the second gating means and generates a pulse in response to the free-running clock. The first storage element receives the pulse from the one-shot means. The pulse clears data stored in the first storage element.

In still further aspects of the invention a second storage element receives an output from the first storage element. The output transmits the data stored in the first storage element to the second storage element. A clock inverting means receives the free-running clock and generates an inverted free-running clock. A multiplexer means receives the free-running clock and the inverted free-running clock. It selects either the free-running clock or the inverted free-running clock in response to the clock-enable signal and outputs a selected clock. Thus the second storage element reads and stores the data from the first storage element in response to the selected clock from the multiplexer means.

In further aspects of the invention a third storage means is coupled to receive the data stored in the second storage element. It outputs the synchronized gating signal. The conditioning means reads and stores the data from the second storage element in response to the inverted free-running clock. The first storage element comprises a D-type flip-flop.

DETAILED DESCRIPTION

The present invention relates to an improvement for synchronizing and conditioning a clock-gating signal. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
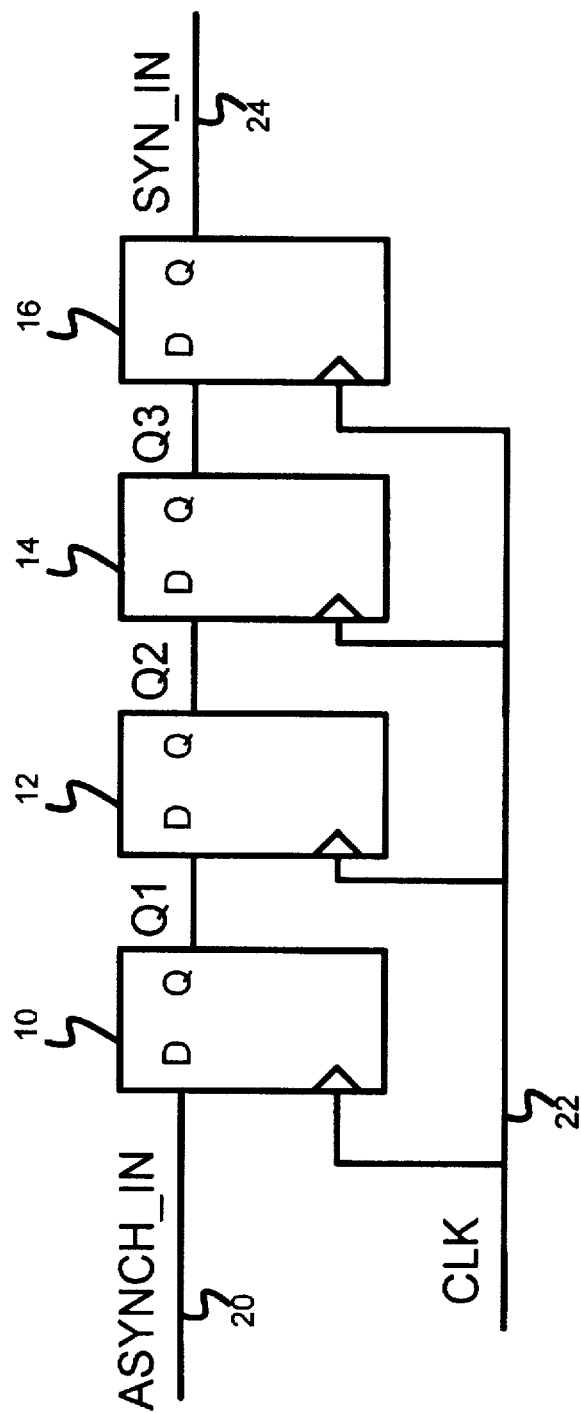
FIG. 1 is a simple prior-art synchronizer.
Figure 2:
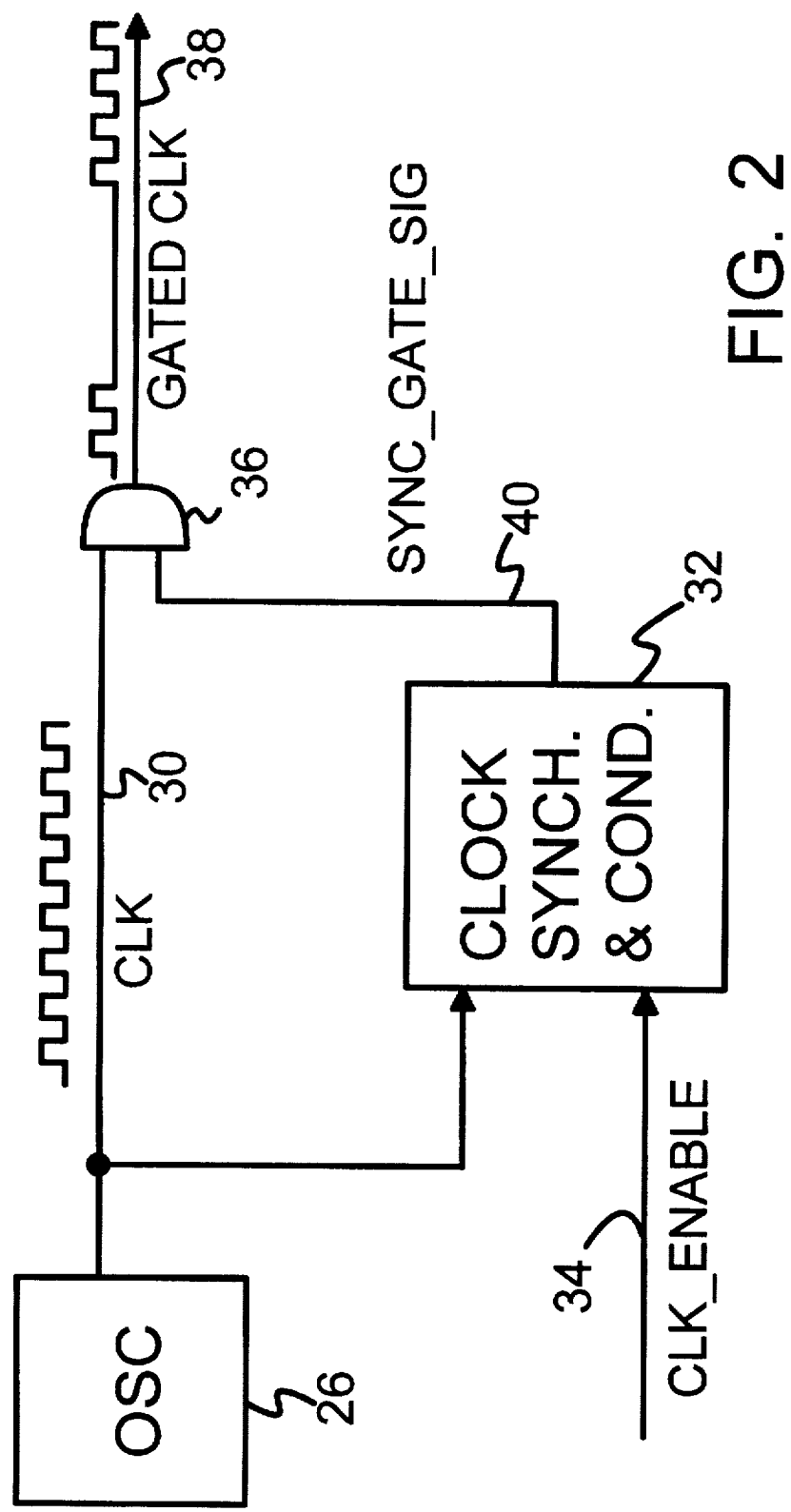
FIG. 2 is a diagram of a clock switching circuit.

FIG. 2 is a diagram of a clock switching circuit. Oscillator 26 generates a free-running clock 30. Oscillator 26 may be an external crystal oscillator, or an on-chip oscillator such as a simple ring oscillator. Clock 30 and enable signal 34 are input to clock conditioner and synchronizer 32 which synchronizes the asynchronous enable signal 34 to the synchronous free-running clock 30. Clock conditioner and synchronizer 32 also conditions the gating signal to prevent partial pulses from being generated. The conditioned and synchronized gating signal 40 is input to 2-input AND gate 36 which also receives free-running clock 30.

AND gate 36 gates free-running clock 30 under control of synchronized gating signal 40. When synchronized gating signal 40 is low, AND gate 36 prevents free-running clock 30 from being propagated to gated clock 38, while when synchronized gating signal 40 is high, AND gate 36 propagates free-running clock 30 to gated clock 38. Thus gated clock 38 has periods of time when pulses are not generated, when the clock is disabled. Partial pulses of gated clock 38 could occur if synchronized gating signal 40 was not conditioned and synchronized.

Figure 3:
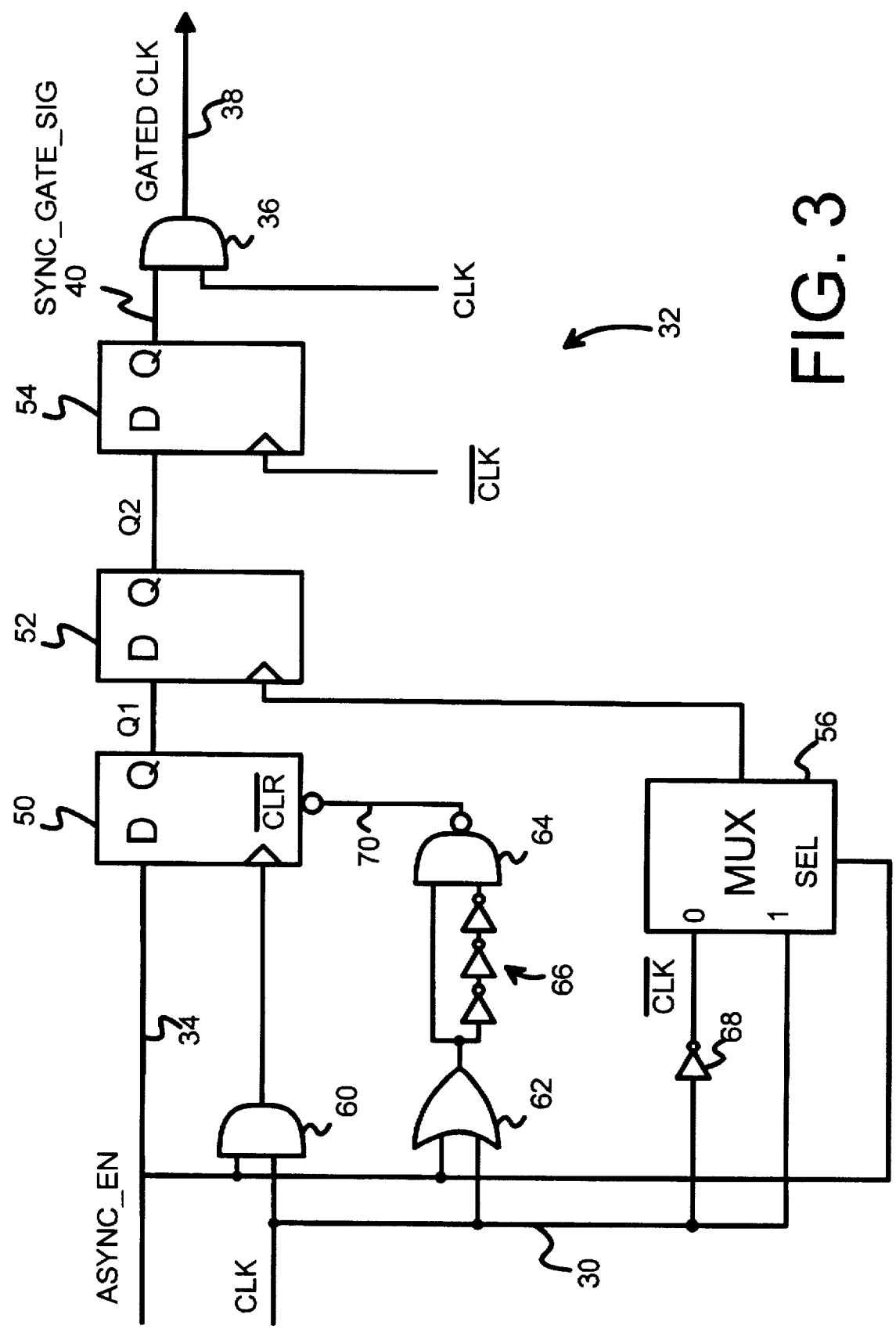
FIG. 3 is a schematic diagram of clock conditioner and synchronizer and AND gate of FIG. 2.

FIG. 3 is a schematic diagram of clock conditioner and synchronizer 32 and AND gate 36 of FIG. 2. First-stage flip-flop 50 receives the asynchronous clock enable signal 34 at its D-input. First-stage flip-flop 50 is meta-stable hardened by gates 60, 62, 64, 66, which reduce the likelihood of first-stage flip-flop 50 going metastable under the operating conditions of a clock gating circuit. AND gate 60 and OR gate 62 each receive as inputs asynchronous enable signal 34 and free-running clock 30. AND gate 60 and OR gate 62 operate in cooperation to enable either the clock input or the clear input to first-stage flip flop 50, but not both inputs simultaneously. When asynchronous enable signal 34 is high, AND gate 60 is enabled to propagate free-running clock 30 to the clock input of first-stage flip-flop 50, while OR gate 62 is prevented from propagating free-running clock 30 to the clear input of first-stage flip-flop 50. Thus when AND gate 60 propagates free-running clock 30, OR gate 62 blocks free-running clock 30.

Chain-of-inverters 66 and NAND gate 64 operate as a one-shot generator. When asynchronous enable signal 34 is low and free-running clock 30 transitions from low-to-high (the rising edge), the output from OR gate 62 switches from low to high. The new high output immediately drives the clear output signal 70 of NAND gate 64 low through the direct input to NAND gate 64. The second input to NAND gate 64 inverts the new high from OR gate 62 after a delay determined by the delays through chain of inverters 66. This new high is propagated through chain of inverters 66 and inverted to a low before being input to the second input of NAND gate 64. This new low input forces the clear output signal 70 of NAND gate 64 high, ending the low pulse on clear output signal 70. Thus a single low pulse is generated on clear output signal 70 when asynchronous enable signal 34 is low and free-running clock 30 transitions from low-to-high.

The delays through AND gate 60 and OR gate 62 are approximately matched. On the rising edge of free-running clock 30, either the clock input of first-stage flip-flop 50 is clocked, or a clear pulse is generated on clear output signal 70 and presented to the asynchronous clear input of first-stage flip-flop 50. Should asynchronous enable signal 34 switch from high to low at the same instant that the rising edge of free-running clock 30 occurs, then AND gate 60 will propagate the rising edge and first-stage flip-flop 50 will clock in the new low on asynchronous enable signal 34, which is presented on the D-input before AND gate 60 disabled the clock edge. The new low on enable signal 34 is always presented to the D-input before AND gate 60 disables the clock, since AND gate 60 has a positive, finite delay to propagate enable signal 34 while enable signal 34 is immediately presented to the D-input without any gate propagation delay.

When enable signal 34 transitions low at about the same time that the rising edge of free-running clock 30 occurs, if a shortened or runt clock pulse is generated by AND gate 60, resulting in first-stage flip-flop 50 going meta-stable, a clear pulse will also be generated since OR gate 62 matches the propagation delay of AND gate 60. This clear pulse is applied to the clear input of first-stage flip-flop 50 after the low on the D-input is perhaps partially clocked in. This clear pulse then ensures that first-stage flip-flop 50 is fully cleared, even if the low on the D-input was not fully clocked in, or if somehow a full clear pulse is not generated. Thus the clear pulse reinforces the low clocked in, and first-stage flip-flop 50 is less likely to remain meta-stable.

When enable signal 34 transitions from high-to-low at the same time that the rising edge of free-running clock 30 occurs, the new high is presented to the D-input of first-stage flip-flop 50 before the rising clock edge of free-running clock 30 can propagate through AND gate 60 to the clock input of first-stage flip-flop 50. Thus the D-input set-up time is always met and first-stage flip-flop 50 cannot go metastable.

When enable signal 34 transitions from high-to-low at the same time that the rising edge of free-running clock 30 occurs, it is possible that the clear pulse will occur immediately after the new high on enable signal 34 is clocked into the D-input. If this clear is full-width, then first-stage flip-flop 50 is fully cleared, and the new high on the D-input is clocked in on the next rising edge of free-running clock 30.

If the clear is cut short by enable signal 34 rising before the rising edge of free-running clock 30 propagates through chain of inverters 66, then first-stage flip-flop 50 may go metastable. This condition can occur when enable signal 34 transitions from low-to-high. Since first-stage flip-flop 50 may become metastable under this condition, and extra period of time is allocated for first-stage flip-flop 50 to settle or resolve before its output is clocked into second-stage flip-flop 52. Mux 56 selects free-running clock 30 when enable signal 34 is high, but free-running clock 30 inverted by inverter 68 when enable signal 34 is low. Thus when enable signal 34 is low, second-stage flip-flop 52 is clocked by the inverted clock, which effectively latches the output from first-stage flip-flop 50 one-half clock period later than usual. This additional half-clock period doubles the amount of time available for first-stage flip-flop 50 to settle or resolve a metastability, greatly increasing the likelihood that the metastability is resolved before second-stage flip-flop 52 is clocked.

A shortened clear pulse is the primary means to cause metastability in first-stage flip-flop 50. This shortened clear pulse can occur when the rising edge of free-running clock 30 occurs at about the same time that asynchronous enable signal 34 transitions. Either edge (high-to-low or low-to-high) of enable signal 34 can cause metastability. However, when enable signal transitions from high-to-low, a low on the D-input of first-stage flip-flop 50 is clocked in which reinforces any runt clear pulse. Thus first-stage flip-flop 50 is much less likely to become metastable on the falling edge of enable signal 34 than for the rising edge. The synchronizer 32 is thus skewed to be more likely to go metastable on the rising edge of enable signal 34 than on the falling edge.

Multiplexer 56 increases the settling time for first-stage flip-flop 50 when this rising edge of enable signal 34 occurs. Second-stage flip-flop 52 is clocked one-half clock period later for this rising edge of enable signal 34 than for its falling edge.

Multiplexer 56 cannot cause second-stage flip-flop 52 to become metastable, even when enable signal 34, the mux select, changes on one of the edges of free-running clock 30.

Metastability cannot occur because enable signal 34 changes at a lower frequency than the frequency of free-running clock 30. Enable signal 34 does not transition high and then low in two consecutive cycles of free-running clock 30. Thus the D-input to second-stage flip-flop 52 will be in a constant state when enable signal 34 changes. Even when a partial clock pulse is generated from multiplexer 56, second-stage flip-flop 52 cannot go metastable since the D-input is not changing, nor are the internal states of second-stage flip-flop 52.

Conditioning flip-flop 54 receives the output from second-stage flip-flop 52, and is clocked by the inverted free-running clock 30. Conditioning flip-flop 54 has one full clock period of setup time to its D-input when enable signal 34 is low, but only one-half clock period of setup time when enable signal 34 is high. Since the Q output of second-stage flip-flop 52 is directly connected to the D-input of conditioning flip-flop 54, even a half clock period provides sufficient setup time.

Conditioning flip-flop 54 ensures that synchronized gating signal 40 can only change on the falling edge of free-running clock 30. A partial pulse cannot be output from AND gate 36 because synchronized gating signal 40 only changes state after the falling edge of free-running clock 30, once the clock pulse has completed. Also, synchronized gating signal 40 changes a short delay after the falling edge of free-running clock 30, the short delay including the propagation delays by inverter 68 and by conditioning flip-flop 54.

Figure 4:
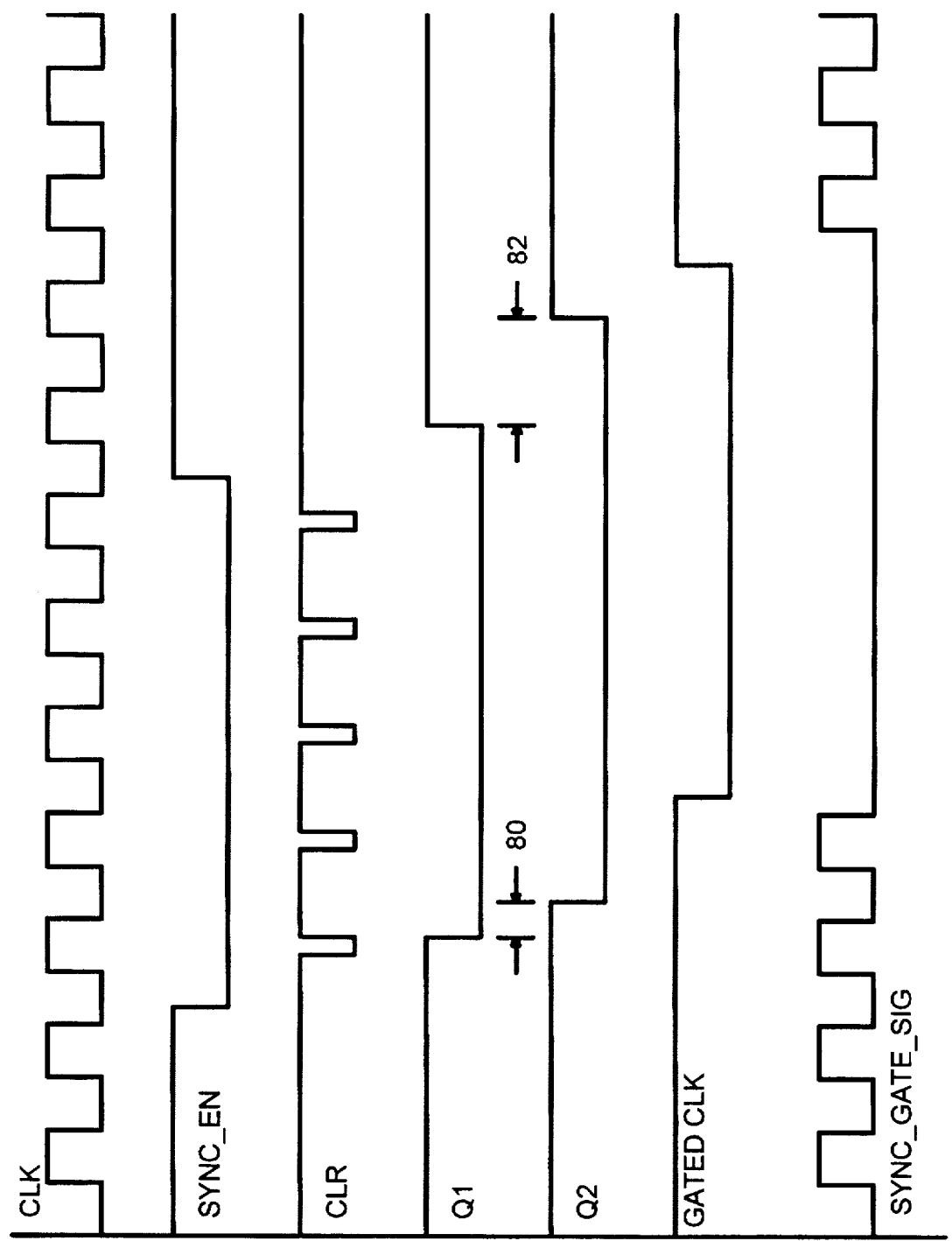
FIG. 4 is a waveform diagram of the operation of the synchronizer and gating circuit of FIG. 3.

FIG. 4 is a waveform diagram of the operation of the synchronizer and gating circuit of FIG. 3. Enable signal 34 changes at a slower frequency than free-running clock 30. When enable signal 34 is high, free-running clock 30 is propagated through AND gate 36 by synchronized gating signal 40. The latency from changes in enable signal 34 to synchronized gating signal 40 is just two clock cycles. On the third cycle of free-running clock 30, gated clock 38 is enabled or disabled and begins or ends pulsing. When disabled, gated clock 38 remains in the low state and does not pulse.

When asynchronous enable signal 34 falls, the next rising clock edge of free-running clock 30 generates a clear pulse signal 70. Clear pulses are also generated for every rising edge of free-running clock 30 while enable signal 34 is low. The rising edge of enable signal 34 causes these clear pulses to cease, and on the next rising edge of free-running clock 30 the new high on enable signal 34 is clocked from the D-input to the Q1 output of first-stage flip-flop 50.

Q1 from first-stage flip flop 50 is clocked to the Q output (Q2) of second-stage flip-flop 52 on the next rising edge of free-running clock 30 when enable signal 34 is high. However, Q1 from first-stage flip flop 50 is clocked to the Q output (Q2) of second-stage flip-flop 52 on the next falling edge of free-running clock 30 when enable signal 34 is low. FIG. 4 shows a half-clock-period delay 80 when enable signal 34 has become low, but a full clock-period delay 82 when enable signal 34 has become high. Thus additional delay is provided for resolving any metastability in first-stage flip-flop 50 for the rising edge of enable signal 34, when metastability is more likely to occur.

Q2 from the Q output of second-stage flip-flop 52 is clocked to the Q output of conditioning flip-flop 54 on the following falling edge of free-running clock 30. The Q output of conditioning flip-flop 54 is synchronized gating signal 40. When synchronized gating signal 40 is high, free-running clock 30 is passed through to gated clock 38. However, when synchronized gating signal 40 is low, free-running clock 30 is blocked and a low voltage is output on gated clock 38.

ADVANTAGES OF THE INVENTION

The synchronizer and gating circuit has low skew. The skew is merely the propagation delay through AND gate 36, and any clock or I/O skew. Low clock skew is important in many synchronous systems and especially critical for higher-speed systems such as microprocessors.

The latency for enabling or disabling the gated clock is reduced. The first stage flip-flop is 'metastable hardened' to reduced the likelihood of it becoming metastable. The clear is pulsed at the same time as the asynchronous input is clocked in for simultaneous enable and clock signals. When the asynchronous input is low, the clear merely reinforces the clocking of the low into the flip-flop, and thus metastability is unlikely. However, when the asynchronous input is high, the clear could increase the chance that the flip-flop becomes metastable. In that case additional delay is added before the output from this first stage is clocked to the next stage. Thus the likelihood of becoming metastable is skewed for one edge, and compensation is made by increasing the time for the first stage to settle.

ALTERNATE EMBODIMENTS

Several other embodiments are contemplated by the inventors. For example inverting logic may be used, both for the gates and for the flip-flops. Other types of flip-flops besides D-type could be employed. These modifications will be apparent to those with skill in the art. The timing of the clear pulse may easily be adjusted by the number and delay of the inverters in the chain of inverters.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A synchronizer and clock gating circuit comprising:
   a first input, the first input for receiving a free-running clock, the free-running clock pulsing between a first state and a second state;
   a second input, the second input receiving a clock-enable signal, the clock-enable signal being asynchronous to the free-running clock;
   a synchronizing circuit receiving the free-running clock and receiving the clock-enable signal, for synchronizing the timing of the clock-enable signal to the free-running clock, the synchronizing circuit outputting a synchronized gating signal;
   the synchronizing circuit including conditioning means for preventing the synchronized gating signal from changing state when a gated clock output is pulsed into the second state; and
   clock gating means, receiving the free-running clock and receiving the synchronized gating signal, for propagating the free-running clock to the gated clock output when the synchronized gating signal is in an enabled state, but not propagating the free-running clock to the gated clock output when the synchronized gating signal is not in the enabled state, the gated clock output remaining in the first state and not transitioning to the second state when the synchronized gating signal is not in the enabled state;
   whereby the clock-enable signal is synchronized to the free-running clock and conditioned to prevent the synchronized gating signal from changing state when the gated clock output is pulsed into the second state.

2. The synchronizer and clock gating circuit of claim 1 wherein the synchronizing circuit further comprises:
   first gating means, receiving the clock-enable signal and receiving the free-running clock, for propagating the free-running clock in response to the clock-enable signal;
   a first storage element receiving the clock-enable signal and coupled to the first gating means, for sampling and storing the asynchronous clock-enable signal in response to the free-running clock propagated through the first gating means.

3. The synchronizer and clock gating circuit of claim 2 wherein the synchronizing circuit further comprises:
   second gating means, receiving the clock-enable signal and receiving the free-running clock, for propagating the free-running clock in response to the clock-enable signal;
   one-shot means, responsive to the free-running clock propagated through the second gating means, for generating a pulse in response to the free-running clock;
   the first storage element receiving the pulse from the one-shot means.

4. The synchronizer and clock gating circuit of claim 3 wherein the pulse clears data stored in the first storage element.

5. The synchronizer and clock gating circuit of claim 3 wherein the synchronizing circuit further comprises:
   a second storage element, receiving an output from the first storage element, the output transmitting the data stored in the first storage element to the second storage element.

6. The synchronizer and clock gating circuit of claim 5 wherein the synchronizing circuit further comprises:
   clock inverting means, receiving the free-running clock, for generating an inverted free-running clock;
   multiplexer means, receiving the free-running clock and the inverted free-running clock, for selecting either the free-running clock or the inverted free-running clock in response to the clock-enable signal, the multiplexer means outputting a selected clock;
   wherein the second storage element reads and stores the data from the first storage element in response to the selected clock from the multiplexer means.

7. The synchronizer and clock gating circuit of claim 6 wherein the conditioning means comprises:
   third storage means, coupled to receive the data stored in the second storage element, for outputting the synchronized gating signal.

8. The synchronizer and clock gating circuit of claim 7 wherein the conditioning means reads and stores the data from the second storage element in response to the inverted free-running clock.

9. The synchronizer and clock gating circuit of claim 8 wherein the first storage element comprises a D-type flip-flop.

10. The synchronizer and clock gating circuit of claim 7 wherein the first state comprises a low voltage and the second state comprises a high voltage.

11. The synchronizer and clock gating circuit of claim 7 wherein the first gating means logically ANDs the free-running clock and the clock-enable signal while the second gating means logically ORs the free-running clock with the clock-enable signal.

12. A meta-stable-skewed synchronizer comprising:

a synchronous clock input for a clock;

an asynchronous input for an enable signal, the enable signal changing at a frequency less than half the frequency of the clock, the enable signal having a first edge and a second edge;

first storage means, receiving the clock and the enable signal, for storing the enable signal in response to the clock, the first storage means including means for skewing to a higher probability of becoming metastable when the first edge of the enable signal is received than when the second edge of the enable signal is received;

clock inversion means, receiving the clock, for generating an inverted clock;

select means, receiving the clock and the inverted clock, for selecting the clock or the inverted clock in response to the enable signal, the select means outputting a selected clock; and second storage means, receiving an output from the first storage means, for generating a second output, the second output being generated in synchronization to the selected clock, wherein the selected clock is selected such that the time delay from the first storage means storing the enable signal in response to the clock until the second storage means generating the second output is adjusted to account for the skew in the probability of becoming metastable, whereby the second output is synchronized to the clock.

13. The meta-stable-skewed synchronizer of claim 12 wherein the selected clock is the inverted clock after the first edge of the enable signal is received, the first edge having the higher probability of becoming metastable.

14. The meta-stable-skewed synchronizer of claim 13 wherein the first storage means includes a flip-flop, the flip-flop having a data input, a clock input, and a clear input, the data input being clocked to the output in response to the clock input, the clear input clearing the data stored in the flip-flop in response to a clear pulse.

15. The meta-stable-skewed synchronizer of claim 14 wherein the means for skewing to a higher probability of becoming metastable when the first edge of the enable signal is received than when the second edge of the enable signal is received comprises:

clock input gate means, receiving the clock and the enable signal, for propagating the clock to the clock input of the flip-flop in response to the enable signal;

clear pulse generating means, receiving the clock and the enable signal, for generating the clear pulse in response to an edge of the clock and in response to the enable signal, the clear pulse being applied to the clear input of the flip-flop.

16. The meta-stable-skewed synchronizer of claim 15 wherein the clock input gate means includes means for logically ANDing the clock and the enable signal, while the clear pulse generating means includes means for logically ORing the clock with the enable signal.

17. The meta-stable-skewed synchronizer of claim 16 wherein the clock input gate means comprises an AND gate and wherein the clear pulse generating means comprises an OR gate and a pulse generator.

18. A synchronizer comprising:

a synchronous clock input for a clock;

an asynchronous input for an enable signal, the enable signal changing at a frequency less than half the frequency of the clock, the enable signal having a first edge and a second edge;

a first gate for propagating the clock in response to the enable signal;

a first flip-flop having a data input connected to the enable signal and a clock input receiving an output of the first gate;

a clear gate for not propagating the clock in response to the enable signal, wherein the clear gate does not propagate the clock when the first gate propagates the clock, but the clear gate propagates the clock when the first gate does not propagate the clock;

a clear pulse generator, responsive to the clear gate, for generating a clear pulse to clear the flip-flop;

clock inversion means, receiving the clock, for generating an inverted clock;

select means, receiving the clock and the inverted clock, for selecting the clock or the inverted clock in response to the enable signal, the select means outputting a selected clock;

a second flip-flop, transmitting an output of the flip-flop to a second output of the second flip-flop in response to the selected clock, whereby the second output of the second flip-flop is synchronized to the clock.

* * * * *